United States Patent
Bell et al.

(10) Patent No.: US 9,056,419 B2
(45) Date of Patent: Jun. 16, 2015

(54) SIZING TANK WITH ELECTRO-MECHANICAL CONTROLLED WATER FLOWS

(71) Applicants: Richard C. Bell, West Palm Beach, FL (US); R. Brandon Bell, West Palm Beach, FL (US)

(72) Inventors: Richard C. Bell, West Palm Beach, FL (US); R. Brandon Bell, West Palm Beach, FL (US)

( * ) Notice: Subject to any disclaimer, the term of this patent is extended or adjusted under 35 U.S.C. 154(b) by 0 days.

(21) Appl. No.: 14/325,743

(22) Filed: Jul. 8, 2014

(65) Prior Publication Data

US 2014/0318647 A1     Oct. 30, 2014

Related U.S. Application Data

(63) Continuation-in-part of application No. 13/410,847, filed on Mar. 2, 2012, now Pat. No. 8,807,163.

(60) Provisional application No. 61/448,387, filed on Mar. 2, 2011.

(51) Int. Cl.
| | |
|---|---|
| *F17D 1/20* | (2006.01) |
| *B29C 47/92* | (2006.01) |
| *B29C 47/00* | (2006.01) |
| *B29C 47/90* | (2006.01) |
| *F04F 3/00* | (2006.01) |

(52) U.S. Cl.
CPC ........ *B29C 47/92* (2013.01); *B29C 2947/92019* (2013.01); *B29C 2947/92209* (2013.01); *B29C 2947/92923* (2013.01); *B29C 2947/926* (2013.01); *B29C 2947/92971* (2013.01); *B29C 47/0023* (2013.01); *B29C 47/905* (2013.01); *F04F 3/00* (2013.01); *B29C 2947/92514* (2013.01); *B29C 2947/92704* (2013.01)

(58) Field of Classification Search
CPC   B29C 47/0813; B29C 47/92; B29C 47/8895; B29C 47/825; B29C 45/1732; B29C 2035/1616; Y10T 29/49826
USPC ...... 137/487.5, 8, 590, 592, 561 R, 571, 574; 264/237, 40.3, 348; 425/71, 67
See application file for complete search history.

(56) References Cited

U.S. PATENT DOCUMENTS

| | | | |
|---|---|---|---|
| 3,668,288 A * | 6/1972 | Takahashi | 264/46.1 |
| 3,862,285 A * | 1/1975 | North et al. | 264/562 |
| 4,029,452 A | 6/1977 | Schippers et al. | |
| 4,078,033 A | 3/1978 | Czerwon et al. | |
| 4,137,025 A | 1/1979 | Graves et al. | |
| 4,154,563 A | 5/1979 | Johnson | |
| 4,181,487 A | 1/1980 | Kessler | |
| 4,247,506 A * | 1/1981 | Summers | 264/177.16 |
| 4,401,424 A * | 8/1983 | De Zen | 425/388 |

(Continued)

*Primary Examiner* — John K Fristoe, Jr.
*Assistant Examiner* — Minh Le
(74) *Attorney, Agent, or Firm* — Lambert & Associates; Gary E. Lambert; David J. Connaughton, Jr.

(57) ABSTRACT

A vacuum sizing tank configured to provide controlled fluid flow. A fluid control system and a vacuum sizing tank utilizing electronic controls to create and maintain controllable fluid flow within the tank. Flow meters may measure the flow in and out of the tank to maintain consistency. Temperature meters may measure the temperatures for each of the flows to maintain consistency. An electronic circuit may compare the values with preset values. Any difference between the values may trigger change by varying the voltage applied to a variable speed water pump.

20 Claims, 9 Drawing Sheets

(56) References Cited

U.S. PATENT DOCUMENTS

| | | |
|---|---|---|
| 4,411,613 A | 10/1983 | Gauchel et al. |
| 4,530,650 A * | 7/1985 | Milani .................... 425/71 |
| 4,575,326 A * | 3/1986 | French .................... 425/71 |
| 4,740,146 A * | 4/1988 | Angelbeck .................... 425/71 |
| 4,750,873 A | 6/1988 | Loe et al. |
| 5,008,051 A | 4/1991 | DeCoursey et al. |
| 5,340,295 A | 8/1994 | Preiato et al. |
| 5,464,335 A | 11/1995 | Bessemer et al. |
| 5,499,507 A | 3/1996 | Dorninger |
| 5,607,638 A * | 3/1997 | Cadwell .................... 264/560 |
| RE36,585 E | 2/2000 | Purstinger |
| 6,019,934 A * | 2/2000 | Schulte .................... 264/558 |
| 6,213,752 B1 * | 4/2001 | Sadinski .................... 425/186 |
| 6,244,847 B1 * | 6/2001 | Wegmaier et al. .................... 425/71 |
| 6,368,547 B1 * | 4/2002 | Visscher .................... 264/558 |
| 6,401,480 B2 | 6/2002 | Krumbock et al. |
| 6,620,354 B1 * | 9/2003 | Bessemer et al. .................... 264/40.6 |
| 6,813,576 B1 | 11/2004 | Topf |
| 7,300,611 B2 * | 11/2007 | Bonvin et al. .................... 264/45.9 |
| 8,316,879 B2 * | 11/2012 | Saito et al. .................... 137/487.5 |
| 2004/0071804 A1 * | 4/2004 | Klein .................... 425/70 |
| 2005/0208166 A1 * | 9/2005 | Leseman .................... 425/113 |
| 2008/0116604 A1 * | 5/2008 | Thomas .................... 264/237 |

* cited by examiner

SIZING TANK WITH ELECTRO-MECHANICAL CONTROLLED WATER FLOWS

PRIORITY CLAIM

This application is a continuation-in-part application which claims the benefit of U.S. Non-provisional application Ser. No. 13/410,847 filed on Mar. 2, 2012, which claims priority to Provisional Application No. 61/448,387 filed Mar. 2, 2011.

BACKGROUND OF THE INVENTION

1. Field of the Invention

The present disclosure relates generally to extrusion, and in particular relates to extrusion processing. More particularly, the present invention relates to a system capable of applying and controlling water and vacuum applied to extrudate material.

2. Description of the Prior Art

A typical method for forming parts from plastic utilizes the extrusion method. This method involves a plurality of materials and compounds which are extruded from an extruder. Upon immediately exiting the extruder, the plastic may remain in the molten state. In this state, the molten plastic is easily susceptible to deformation up until it is sufficiently cooled to a solid state.

Accordingly, the molten extrudate must be subject to a strictly controlled atmosphere until it solidifies. There are several methods utilized to minimize the unwanted deformation of the molten extrudate.

While all of these methods minimize unwanted deformations in the molten extrudate, controlling the water itself is an important factor. Water has a mass significant with respect to small extrudate. Any unwanted currents, temperatures, or flows, will have unwanted forces acting on the extrudate. An unwanted flow can push on the wall of thin tube extrudate, resulting in deformation of the desirable circular shape. Flows can also push and pull on the extrudate as the result of forces (eddies). Varying temperatures can change the way extrudate cools, introducing deformations. To further complicate things, rollers may be introduced to prevent hollow extrudate from floating upwards.

Previously, efforts found to control the water flow were minimal. Efforts found included manual attempts to maintain uniform flow. This included simple mechanical valves which were adjusted by an operator. Typically, the valves are completely opened, allowing flow into the tank. This process leaves much to be desired, the control is far from precise, no consideration is given to flow rates or uniformity along the length of the extrudate. Further the process does little to obviate the above mentioned problems present in the prior art.

SUMMARY OF THE INVENTION

The subject matter of this application may involve, in some cases, interrelated products, alternative solutions to a particular problem, and/or a plurality of different uses of a single system or article.

It is an object of the present invention to provide a system capable of maintaining the combination of vacuum and water applied in the extrusion process. It is another object of the invention to create a system capable of controlling the vacuum and water in a specific fashion.

The present invention utilizes a vacuum sizing tank substantially closed to the atmosphere. The vacuum sizing tank may comprise an enclosed trough capable of holding water, holding a plurality of vacuum and a plurality of different water flows. The vacuum sizing tank also comprises an opening for the ingress of molten plastic extrudate and a second opening for the egress of cooled plastic extrudate.

In one aspect of the present invention, the vacuum tank can be modified by outfitting it with a water pump and various manifolds. The water pump applies pressure to the various manifolds, which direct the water into and through the tank in a controlled fashion. One or a plurality of valves may be further utilized to direct and control flow from the pump to inlet or inlets of the tank. The water may be maintained at a specific level using an adjustable drain. The vacuum is applied in a controlled manner, which may or may not be in relation to the water flows.

In yet another aspect of the present invention, the vacuum tank is equipped with a water pump to supply water to the vacuum tank. The vacuum tank may also be equipped with a second water pump to pull water out of the tank. Both pumps may allow for additional control of the resulting water flow through the vacuum tank.

In another aspect the vacuum tank utilizes various water pumps and vacuum systems to create a plurality of water flows and vacuum flows within the tank. The water and vacuum systems are further enhanced by the addition of various sensors which directly measure and monitor flows throughout the system. The sensors may then be connected to various controllers to measure, control, and manipulate the system.

In yet another aspect the vacuum tank utilizes various water pumps and vacuum systems to create a plurality of water flows and vacuum pressures. The vacuum tank has additional physical features such as tooling which may assist in directing the water flow in a more desirable fashion.

In another aspect the invention may be equipped with various water pumps and vacuum systems to create a plurality of water flows and vacuum pressures. Each water flow may have a different temperature. The vacuum tank has additional physical features which may assist in directing the water flow in a more desirable fashion. Furthermore, these physical features may be modular and/or removable to allow a variety of combinations to provide enhancement for the flows.

In yet another aspect the vacuum tank may be outfitted with various water pumps and vacuum systems to create a plurality of water flows and vacuum pressures. The vacuum tanks may utilize various sensors and features to aide in water flow. Furthermore, the vacuum tank my be equipped with a controller to increase water flow, if measured flow has fallen below a predetermined value. The controller may also decrease water flow, if measured flow has risen above a predetermined value. Additionally, vacuum pressure may be controlled in a similar fashion. Vacuum pressure may be fluctuated relative to various systems, such as water flow or with various predetermined values.

In another aspect the vacuum tank may be outfitted with various water reservoirs at varying heights relative to the vacuum tank. The reservoirs may utilize various sensors, geometries, and features to aide in the controlled flow throughout the vacuum tank. Furthermore, these physical features may be modular, adjustable, and/or removable to allow a variety of combinations to provide enhancement for the flows.

In yet another aspect the present invention may be outfitted with vacuum and water pumps and may comprise several tanks such that pressure, water flow and temperature is controlled in incremental sections. These incremental sections may be referred to as 'zones' and may utilize a variety of controls including but not limited to vacuum control, water flow control, temperature control, and furthermore may include sensors to monitor all attributes and may include a control system to utilize the data for precise manipulation.

BRIEF DESCRIPTION OF THE DRAWINGS

Embodiments of the present invention will now be described by way of example only, with reference to the attached figures wherein.

DETAILED DESCRIPTION

Figure 1:
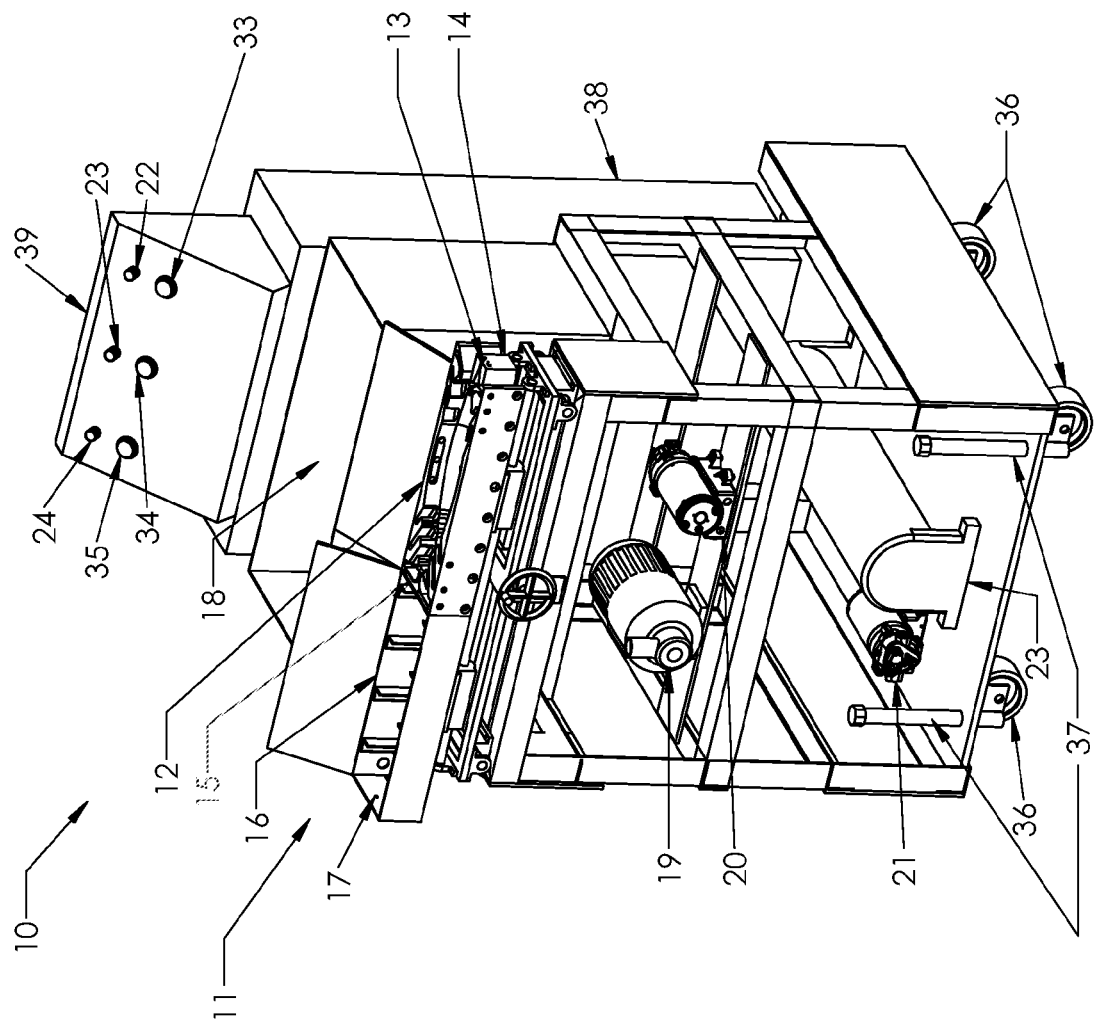
FIG. 1: Perspective external view of an embodiment of the sizing tank is provided.

The process of extrusion contemplated in the present invention involves the use of a vacuum tank. The vacuum tank is placed inline with the other pieces of machinery used in the extrusion process. As the extrudate exits the extruder, the extrudate is in molten form. The extrudate needs to be properly cooled, such that it may be able to achieve desirable dimensions and tolerances.

Vacuum sizing tanks typically include a tank which holds fluid such as water and vacuum is applied. Molten plastic extrudate enters one end of the tank, and the cooled plastic part exits through the other end. Vacuum applies negative pressure to the tank and water applies a medium which removes heat from the part. The tank remains substantially closed to the atmosphere, with the only significant openings to atmosphere being the entrance and exit of the plastic part. It should be understood that this process may involve liquids other than water such as oils, organic solvents, or water-based solution, among others, without straying from the scope of the present invention. However, in some embodiments, it is possible to use the present invention without applying a vacuum, and with the tank being open to the atmosphere.

The resulting forces of vacuum and water, sometimes benefited in parallel with tooling sets, allow the molten extrudate to maintain a desired shape. This is the traditional practice utilized and unchanged for nearly 25 years.

Today, current innovation has allowed for extrusion profiles to shrink dramatically. The resulting reduction in overall shape and mass, has allowed the profiles to be more sensitive and susceptible to deformation. The profiles need to be handled with precision and all variables surrounding the extrudate need to be minimized. The present invention allows for precision extrusion making very small profiles possible. These extruded products may be particularly useful in numerous industries where small diameter and thin wall tubing are valued. In particular, the medical and medical device industry may benefit from plastic extrusions made possible by the present invention.

Additionally, current innovation has introduced thousands of new polymers. The new polymers may be sensitive to varying temperatures as they are cooled. Varying cross sectional areas also demand varying temperatures to allow for proper (even) cooling to minimize deformation. The profiles need to be introduced into a controllable atmosphere which may include certain temperature profiles along the vacuum tank system.

The invention described herein can allow the random and unpredictable forces generated by water and vacuum, and their resulting flows, within the vacuum tank to be minimized and manipulated in a desired fashion. Control of these various flows of vacuum and water allows for vastly enhanced precision in the extrusion process. In one example, testing proved that, on a tube 0.135 inch (") outer diameter (OD, with 0.005" wall thickness, the tolerances on the inner diameter (ID)/OD was just +/−0.0007". Alternatively, this same test on a competing device yielded tolerances on the ID/OD of approximately +/−0.002". As such the present invention proves vastly superior to the existing art in precision extrusion.

The tank is to have a trough capable of holding a body of water deep enough for the plastic part to submerge, and travel in. The body of water is to have water flow which is controllable such that a uniform flow is achieved. Water may enter the trough through one or a plurality of water inlets. The inlets may be positioned at various points along the trough such as the sides, the front or the back. In one embodiment, the tank may have two water inlets, a first inlet on the left side and a second inlet on the right side. Water may exit the device through one or a plurality of water outlets. The outlets may be positioned at various points along the trough such as the sides, the front or the back.

In one embodiment, this uniform flow may be achieved by variable speed water pumps. Furthermore, water pumps may control and manipulate water flow in and out of the tank. A bleeder valve may be added in communication with tank to aide in control of water level or simply release water when desired. The bleeder valve may also be introduced to any flow entering or exiting the tank.

The trough may further have one or a plurality of baffles positioned along its length. The baffles may serve to increase flow consistency, and to stabilize water inlet and/or outlet.

The trough may additionally have one or a plurality of flow channels. The flow channels may control and direct the inlet water flow and control and direct the outlet water flow, and which may serve to separate the water flow in the trough into separate zones.

The trough may further have ridges and channels machined into it. The ridges and channels may serve to increase flow consistency, and to stabilize water inlet and/or outlet.

A splitter may be positioned at an outlet end of the trough. The splitter may be substantially 'V' shaped, with the narrow end facing the flow. The splitter may serve to direct flow away from the center of the trough. At an end of the broader portion of the splitter is an outlet allowing the fluid flow to be directed by the splitter towards the outlet on either end of the splitter. In one embodiment the outlet may be a slit shape extending from nearly the top of the tank to the bottom to provide smooth, laminar flow out of the device without causing any dead zones of stagnant or turbulent water.

Water flow may be controlled in a variety of manners. For example, by utilizing an electrical feedback control system to control water flow within a vacuum sizing tank will result in a more uniform water flow. The flow of water and vacuum will be controlled and manipulated in a plurality of combinations, which may include temperature. Controlling these flows may reduce unwanted forces applied to the extrudate. As a result, the final product which involves passage of molten plastic through the vacuum sizing tank will be improved and allow for further innovation with the extrusion process.

In one embodiment, the water flow is controlled through the trough to be a laminar flow.

In another embodiment, the water flow is controlled through the trough to be substantially laminar, wherein the flow involves only minimal eddies.

In yet another embodiment, the water flow is substantially uniform across the entire length of the trough, such that from the ingress of the extrudate to the egress of the extrudate, the water flow is at a nearly constant rate and has a nearly constant flow profile.

Vacuum is to be applied to the small volume of air above the body of water. In one embodiment, vacuum may be applied and controlled in a manner separate from the control and manipulation of water flows. In another embodiment, vacuum can also be applied and controlled in a manner coordinated with the control and manipulation of water flows. A vacuum control system may include a pressure sensor positioned within the tank, a controller and a vacuum system. The amount of vacuum supplied may be adjusted based on pressure measured within the tank and interpreted by the controller. Vacuum is to be applied and controlled at a predetermined value set with electronic or mechanical control. Vacuum can be applied as a plurality of values and maintained such that constant negative pressure can be applied in coordination with water flow. The vacuum may be applied at a vacuum outlet, which may be positioned anywhere on the sizing tank. In one embodiment, the vacuum outlet is positioned above the trough so water does not enter the vacuum outlet.

Vacuum may be any type of vacuum system capable of drawing a vacuum on the interior of the tank. In one embodiment a vacuum pump may be used. In another embodiment, a blower may be used.

In still another embodiment, a vacuum ejector may be used. The vacuum ejector may be connected to a shop air connection or other pressurized gas flow system. The ejector may use the pressurized air to draw a vacuum on the interior of the tank. An electronic regulator may be in communication with the pressurized air flow to the ejector to provide precision control and maintenance of the air flow and in turn the vacuum applied to the tank by the ejector. A pressure sensor positioned within the tank and/or along the vacuum line may communicate with the electronic regulator to direct the regulator to adjust the vacuum draw. In one embodiment, the ejector may be a three stage diffuser vacuum ejector. Testing indicates that the vacuum ejector may provide greater precision, control and maintenance than any other methods currently known in the art.

In another embodiment, the vacuum control system works with a precision electronic pressure regulator. The pressure regulator controls an output of a high pressure air source via a ten turn potentiometer to a very precise level. The potentiometer controlled air is then fed to vacuum ejector using a three stage diffuser constructed to generate precisely controlled vacuum, eliminating all inefficiencies associated with motors/blowers.

When water flows are measured to be uneven or changing in an undesirable fashion, a water flow detector may communicate to controller and adjust the water pump speed accordingly. The water flow detector may be positioned in any location of the trough capable of measuring water flow. In one embodiment, a plurality of water flow detectors may be employed. Flow may be introduced at one or a plurality of locations, such that uniform flow is achieved along the length of the tank. Water pumps may control each inlet of flow via a manifold, or separately, with a pump dedicated to each inlet. Further, water flow may exit from the trough at one or a plurality of locations. It should be understood that the present invention may be operated as a water bath without a vacuum as well as a vacuum tank with a vacuum drawn within it.

The control and monitoring of vacuum and/or water flow may be performed at numerous sections or zones of the trough by positioning detectors, controllers, water inlets or outlets or valves in specified zones. Such a configuration may serve to provide enhanced water flow, allowing for varying flow conditions, vacuum control and consistency across the zones.

In the instance of water flow being introduced and/or manipulated on individual basis, each case will be a designated zone which may have individual characteristics and predetermined values. Thus, the operator will have the option and ability to manipulate the flow throughout the tank, for each particular product. The detector and controller results in a water flow throughout the vacuum sizing tank which is maintained and manipulated as desired.

In one embodiment, the trough is sized to be large enough to create numerous temperature zones along the length of the trough. For example, to achieve ideal processing of tubing, the water may be at a first temperature in a first zone adjacent to the inlet of the molten extrudate, a second temperature in a second zone at the middle portion of the trough, and a third temperature in a third zone at the exit point of the extrudate.

In an alternate embodiment, the tank may be formed as a cylindrical pipe. The pipe may have an extrudate inlet and extrudate outlet at opposing sides. A fluid flow controller may be positioned at the extrudate inlet side. In one embodiment, the fluid flow controller may be conical in shape. At a tip of the conical shaped flow controller may be an aperture through which the extrudate may enter the tank. At a base of the conical shaped flow controller may be a plurality of fluid inlet ports. In one embodiment, these fluid inlet ports may be spaced equidistantly about the circumference of the cone. By forming the tank as a cylinder, the flow profile is substantially more uniform about a tubular extrudate than a rectangular shaped tank, as eddies and "dead zones" are minimized. Moreover, the conical flow controller and cylindrical shape may allow the flow to mimic the flow of the cylindrical extrudate. As such, minimal undesired forces are applied to the wall of the extrudate, and heat transfer from the extrudate to the fluid is substantially more controllable. The present embodiment may be particularly applicable to extruded tube shapes because the trough has a similar shape (cylindrical) to the extruded tube allowing flow to flow along the extrudate and with the extrudate to minimize forces against it.

In one embodiment the conical flow controller may form a conical interior through which the extrudate may enter the tank.

In another embodiment, a vacuum tank may apply a vacuum to an air space within the tank.

In still another embodiment, a second conical flow controller may be positioned at an extrudate outlet end. In this embodiment, the water flow inlet may be directed at the second conical flow controller such that the water flow is in an opposite direction from the extrudate flow.

In operation, molten extrudate may enter the tank through the tip of the flow controller. Fluid may enter through the plurality of inlets. The surface of the conical flow controller may serve to smoothly direct the inlet fluid flow along its surface flowing towards its end where it meets the extrudate. In this embodiment, the flow may be controlled to minimize unwanted forces. In embodiments configured as described, flow will be in the direction that the extrudate travels. Further, the flow controller may serve to create a smooth, controlled and substantially laminar flow profile. As such, the present invention may allow for enhanced precision of extrudate as well as allowing for very small extruded products.

In another particular embodiment, the present invention may be configured as one or a plurality of inserts that may be placed in an existing rectangular or other shaped vacuum sizing tank, allowing retrofitting of the rectangular tank into a tank of the present invention. This embodiment may be applied to any of the embodiments shown in the figures below, and may be as simple as inserting the trough insert into the existing rectangular trough, and connecting any openings and/or ports as defined by the trough insert. The insert embodiment may be formed of any material capable of being shaped, and retaining its structure when exposed to water and/or other fluid. Non-limiting examples of materials of which the insert may be made include, but are not limited to: metals, plastics, composites, wood, ceramics, and the like. The insert may be formed in any manner either known in the art or to be developed in the future, these manners may include, but are not limited to: injection molding, rotational molding or similar molding processes, may be machined, stamped, 3D printed, and the like.

It should be understood that the vacuum sizing tank, trough, and related elements may be of varying size and shape without straying from the scope of the present invention.

Figure 2:
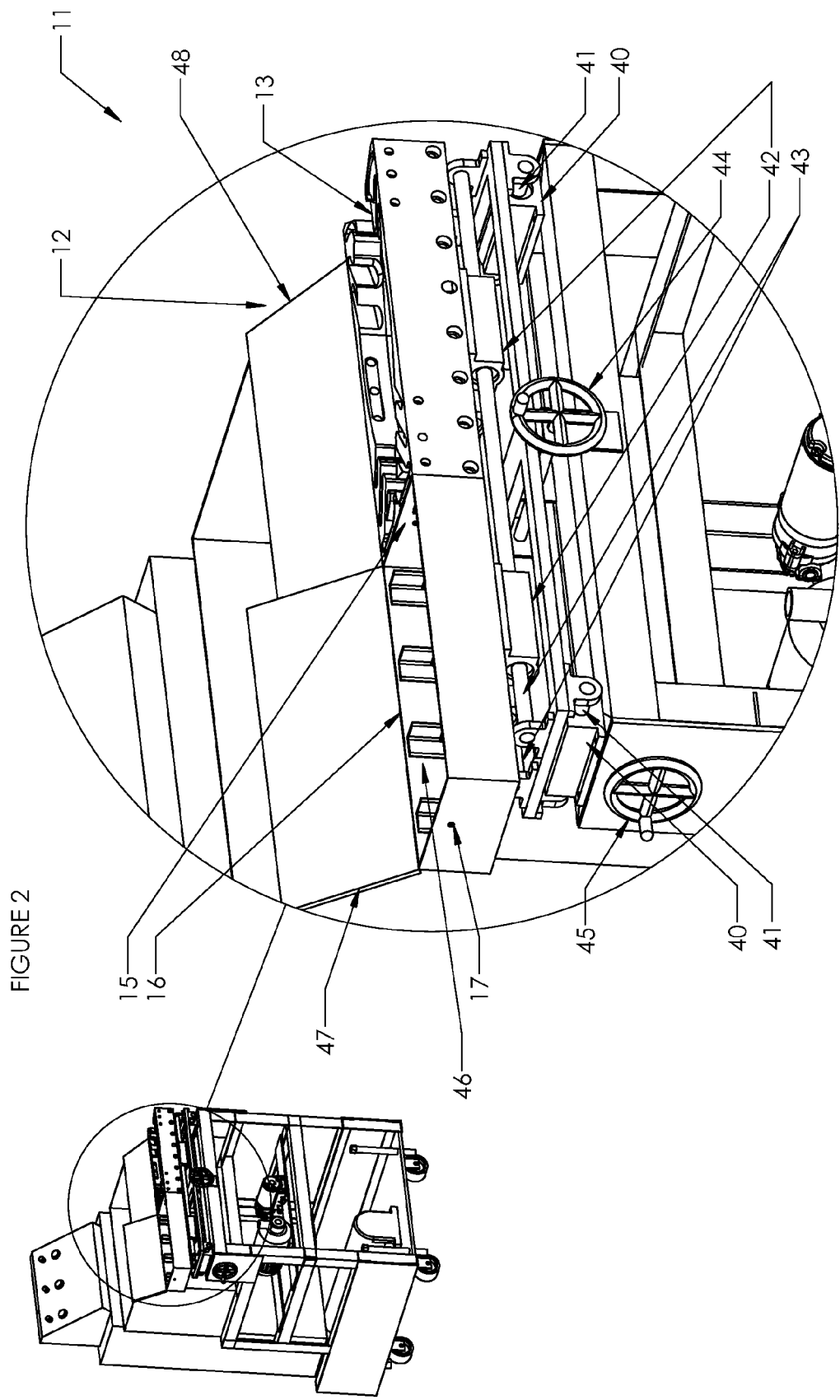
FIG. 2: Closer perspective external view of an embodiment of the sizing tank is provided.
Figure 3:
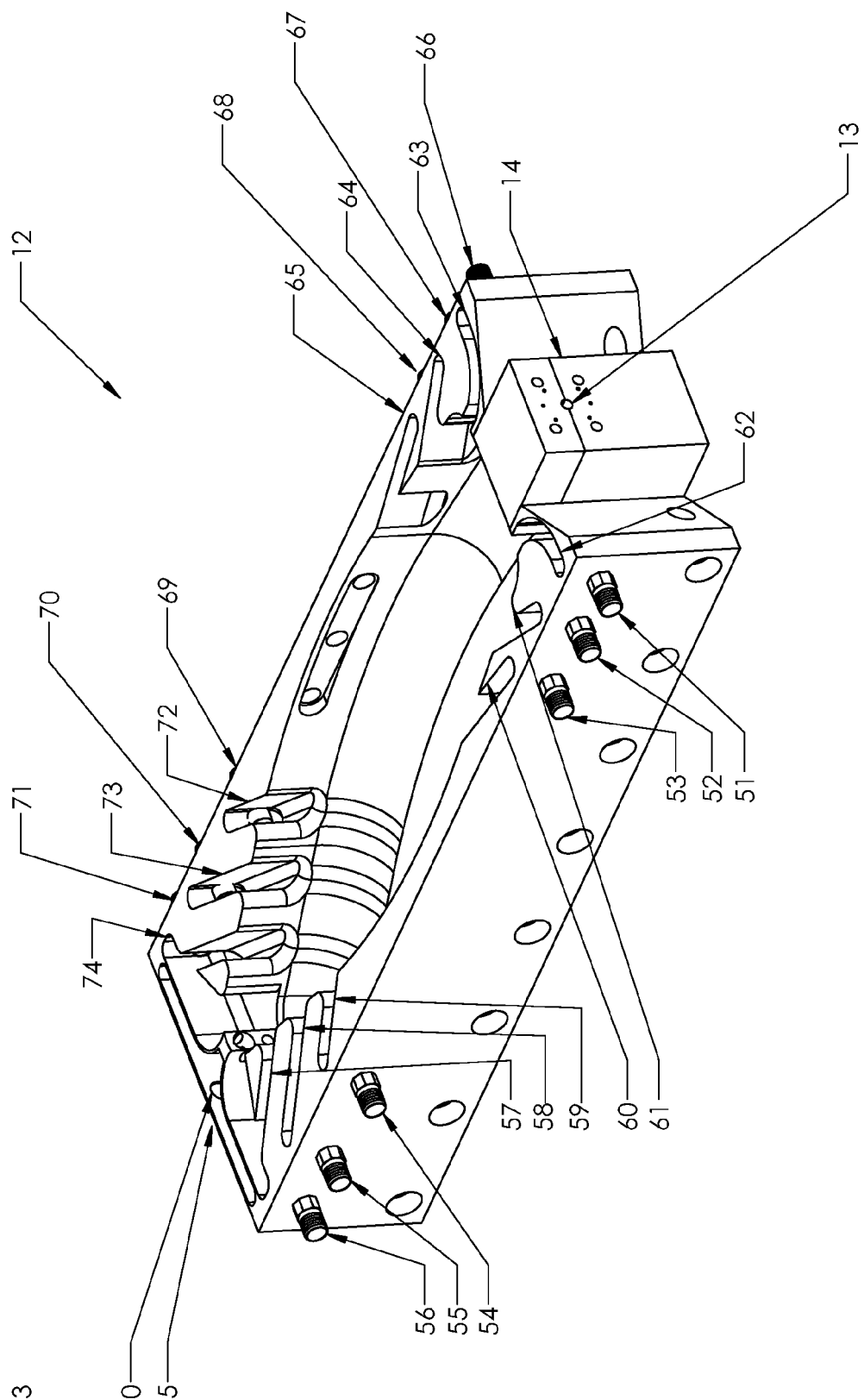
FIG. 3: Detail perspective view of an embodiment of the sizing tank is provided.

FIGS. 1, 2 and 3 show a vacuum sizing system located generally at 10. The molten extrudate enters the system 10 at opening 13 through sizing tooling 14, located on trough 12. The extrudate first undergoes cooling in trough 12 which may hold water, air and vacuum. The extrudate leaves the trough tank 12 at opening 15 and enters auxiliary cooling tank 11 at opening 15. Opening 15 may be considered a common area for extrudate passage which is not significantly open to atmosphere. Lastly, the extrudate exits at outlet 17 where an airwipe (not shown) may be installed to assist in water removal.

It should be understood that the configuration shown in FIG. 3 may be operated in both directions. In other words, in one embodiment, the molten extrudate may enter at 50. In another embodiment, the molten extrudate may enter at 13. The operational direction may vary depending on the requirements of the user.

The water that cools the plastic extrudate may enter tank trough 12 through tooling 14. The water supply is stored in reservoir 18. Some of this water supply will be used generically to simply provide additional cooling capability in auxiliary tank 11 and or in coordination with spray tubes (not shown) that may be outfitted.

Water from reservoir 18 also may enter the trough 12 through a variety of inlet/outlet apertures which may be used as water inlets or outlets, discussed later: 51, 52, 53, 54, 55, 56, 64, 65, 66, 72, 73, 74. The water may enter these openings though line 120 in FIG. 4. Water is pushed through line 120 by water pump 19 for water control purposes either inlet or outlet depending on desired setup. The water flow in this line may be controlled electronically with potentiometer 23, FIG. 1 and/or with valves 80 and 81, FIG. 4.

Water flow through pump 19 is specific to assist in developing desirable water flow control in trough 12. Water pump 19 may be of several specific types including but not limited to rotary style, centrifugal style, AC electric, DC electric, positive displacement, metering pumps etc.

Figure 4:
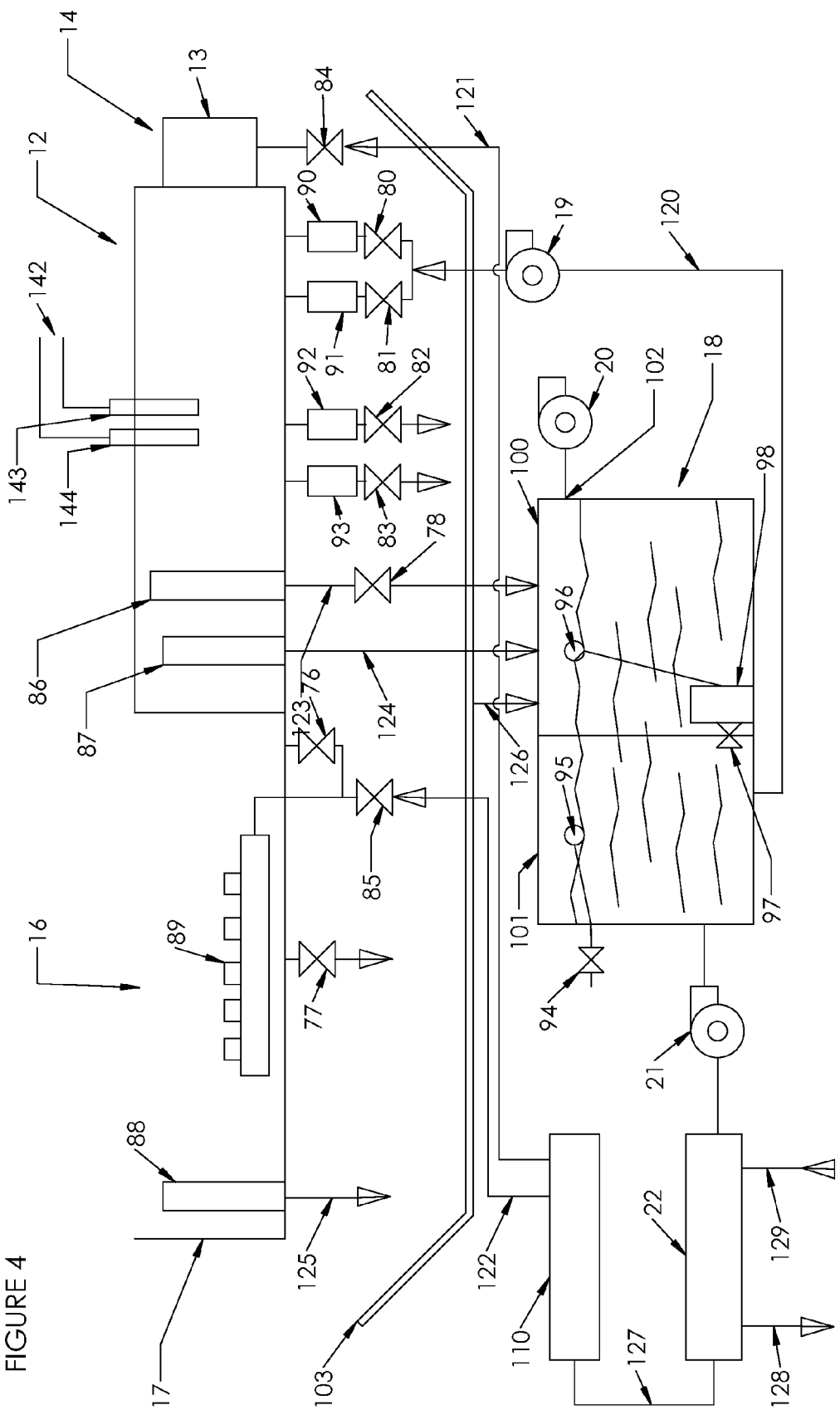
FIG. 4: Simple diagram consisting of components in FIG. 1 is provided.

Line 122, FIG. 4 provides water to auxiliary water tank 11, FIG. 1 and spray tubes from manifold 110 FIG. 4. Pump 21 recirculation pump, FIG. 1 supplies water through heat exchanger 22, FIG. 1 and pumps water into manifold 110, FIG. 4. Valve 94, FIG. 4 is the control of the main water source for reservoir 18, FIG. 1.

Water may also be removed from tank trough 12 through a combination of inlet/outlet apertures which may be used as outlets: 51, 52, 53, 54, 55, 56, 64, 65, 66, 72, 73, 74. The flow may be controlled with valves 80, 81, 82, and 83. The flow may also be controlled by pump 19 as an outlet pump. Various combinations exist to add or remove water from previously mentioned openings. Water flows through valves 82 and 83 into drip pan (not shown).

FIG. 3 further shows flow channels 57-63, 67, 68, 72-74. The flow channels allow varying flow through the inlet/outlet apertures, and may direct, control and stabilize flow of water. In one embodiment, the flow channels may create different flow zones. For example, water may enter at aperture 53 and be directed by flow channel 60 along the outer edge of the trough under a particular set of flow conditions. Because of the geometry of the tank, the majority of the water from aperture 53 will pass into flow channel 59, and exit through aperture 54. This allows the zone along the outer edge of the trough to have a different flow profile compared to other zones of the trough.

In a further embodiment, water may enter at aperture 52, be directed by flow channel 61, and the majority of that flow will pass into flow channel 58, and may exit through aperture 55. It should be understood that further embodiments involve similar inlet and outlet flow to corresponding flow channels. These further embodiments allow numerous flow zones to be created, and allow the zones to interact, thereby creating ideal conditions for the processing of the extrudate. One non-limiting example of interaction between the flow zones comprises a first flow zone and a second flow zone adjacent to one another. The first flow zone may have a first temperature at inlet, the second flow zone may have a different second temperature at inlet. At an intersection of zones there may be a heat exchange caused by conduction, convection and/or radiation. This heat exchange may result in the first flow zone having a third temperature at outlet, and the second flow zone having a fourth temperature at outlet.

Potentiometer 23 controls the speed of pump 19 which is dedicated to the specific water flow in or out of apertures 51, 52, 53, 54, 55, 56, 64, 65, 66, 72, 73 or 74. Potentiometer 24 controls the speed to vacuum system 20 for vacuum level control.

During operation, water height in tank 12 may be optionally limited by standpipe 87 and additionally controlled by previously mentioned pumps 19 if so desired. Excess water may pass through standpipe 87 and into drip pan (not shown) via line 124. Standpipe 88 is to control water height in water bath 16. Water will enter standpipe 88 and enter line 125 which drains into drip pan (not shown).

Pump 21 forces circulation of water through heat exchanger 22 and into manifold 110 via line 127. Manifold 110 may be used to supply water to lines 121 and 122 which is connected to sprayer/misters 89 in bath 16. Water may also be supplied to tooling 14 through line 121 and controlled with valve 84. Additionally, a main water source may be supplied to reservoir 18 via opening 94. Should the water level in reservoir 18 fall too low, float 95 will lower and open valve 94 and water will flow in until reaching desired level. Reservoir 18 is divided into two sections such that 101 is open to the atmosphere and 100 is substantially closed to the atmosphere. Float 96 will lower when water level in 100 becomes too low allowing water from 101 to flow in through opening 97 and through one way check valve 98. All water entering drip pan (not shown) is returned to reservoir 18, opening 101 via line 126.

Vacuum is applied to tank 12 via vacuum system 20. Vacuum may be applied separate of water as a dry vacuum or as a wet vacuum in combination of both air and water. Vacuum is applied via line 123 from reservoir 100 through standpipe 86. Vacuum may be controlled electronically with potentiometer 24 and valve 78. Lids 47 and 48 close on vacuum tank 12 and water bath 16 to allow for closed atmosphere conditions. Brackets 46 may support the water bath 16 vessel as well as lid 47 Vacuum in reservoir 100 appears in tank 12. Standpipe 87 in tank 12 is to control water level. Standpipe 86 is taller such that no water can flow inwards and is for vacuum being applied via line 123. No water will pass into vacuum line 123.

Heat exchanger 22 has an inlet of chilled water through line 129 and the outlet of tepid water through line 128.

Pressure transducer 143 and temperature transducer 144 within tank 12 provide voltage along leads 142. The voltage appears in circuit diagram in FIG. 4 as a temperature and pressure reading. Pressure and temperature displays appear on displays 35 and 34 respectively. The pressure and temperature displays 35 and 34 may be particularly useful for applications of extruded tubing in industries having high levels of regulation. For example a medical industry may have processing requirements for tubing. The displays 35, 34 may allow for recording and monitoring of the extrudate to ensure proper processing requirements. Flow rate sensors 90 and 91 are mounted in line with line 120 which provides voltage to displays such as at 33 to describe flow rate for adjustment references regarding water input to plurality of locations: 51, 52, 53, 54, 55, 56, 64, 65, 66, 69, 70, 71 72, 73, or 74. Flow rate sensors 92 and 93 are mounted to measure flow rate for outlet of water through plurality of locations: 51, 52, 53, 54, 55, 56, 64, 65, 66, 69, 70, 71 72, 73, or 74, which may enter drip pan (not shown). Voltage from sensors 92 and 93 is displayed on display 27 and 28. Voltage from sensors 90, 91, 92, and 93 is further used as a reference such that balanced flow within tank 12 may be achieved and controlled.

The present invention preferably may include a control system that is in communication with the temperature, pressure and flow readings noted above. The control system operates by adjusting temperature, vacuum and water flow based on these readings by adjusting various valves, vacuum pump speed, water pump speed, inlet and outlet water flow rate and inlet and outlet water flow location, among other variables.

The vacuum sizing tank moves on wheels 36. Final adjustment is completed with leveling screws 37. Exact positioning of vacuum tank system 11 is achieved with wheel 44, which moves system 11 fore and aft on linear bearing assembly 40 and 41. Wheel 45 moves system 11 upstream and downstream on linear bearing assembly 42 and 43. Wheel 49 moves system 11 up and down.

Preferably, all electrical components are housed in, or terminated in, electrical enclosures 38 or 39.

As is noted previously, the embodiment shown in these figures could similarly be configured as an insert for an existing rectangular vacuum sizing tank, allowing retrofitting of existing tanks.

Figure 5:
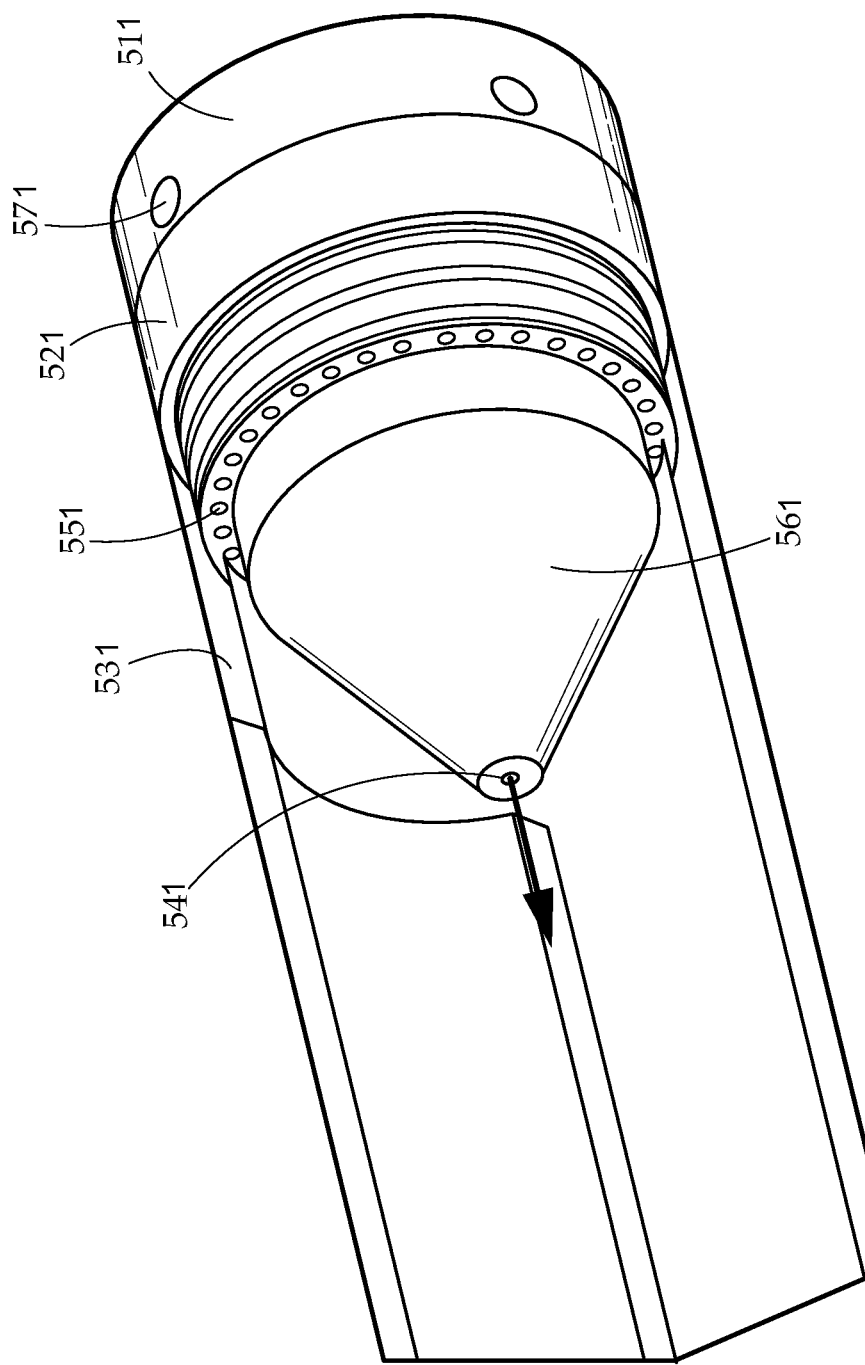
FIG. 5: A perspective cutaway view of an embodiment of the sizing tank is provided.

Turning now to FIG. 5, a cut away view of another embodiment of the present invention is provided. A vacuum sizing tank 531 is shaped as a cylindrical pipe. Attached to an inlet side of the pipe is a flow controller 561. The flow controller 561 is cone shaped to direct inlet fluid from inlet ports 551 in a smooth and uniform flow. It should be understood that inlet ports 551 may be positioned at various points along the edge of the flow controller 561 and also on the surface of the cone of the flow controller 561. Fluid entering the tank 531 from the inlet ports 551 continues down the pipe, as well as travelling in paths along the conical surface of the flow controller 561. At a tip of the flow controller 561 is an opening 541 through which molten extrudate enters the tank 531. The flow controller 561 is attached to a base 521 which forms the inlet ports 551 and attaches the flow controller 561 to the tank 531. An adapter 511 is attached to the base 521. The adapter 511 provides an attachment for fluid inlet tubing at apertures 571.

Figure 6:
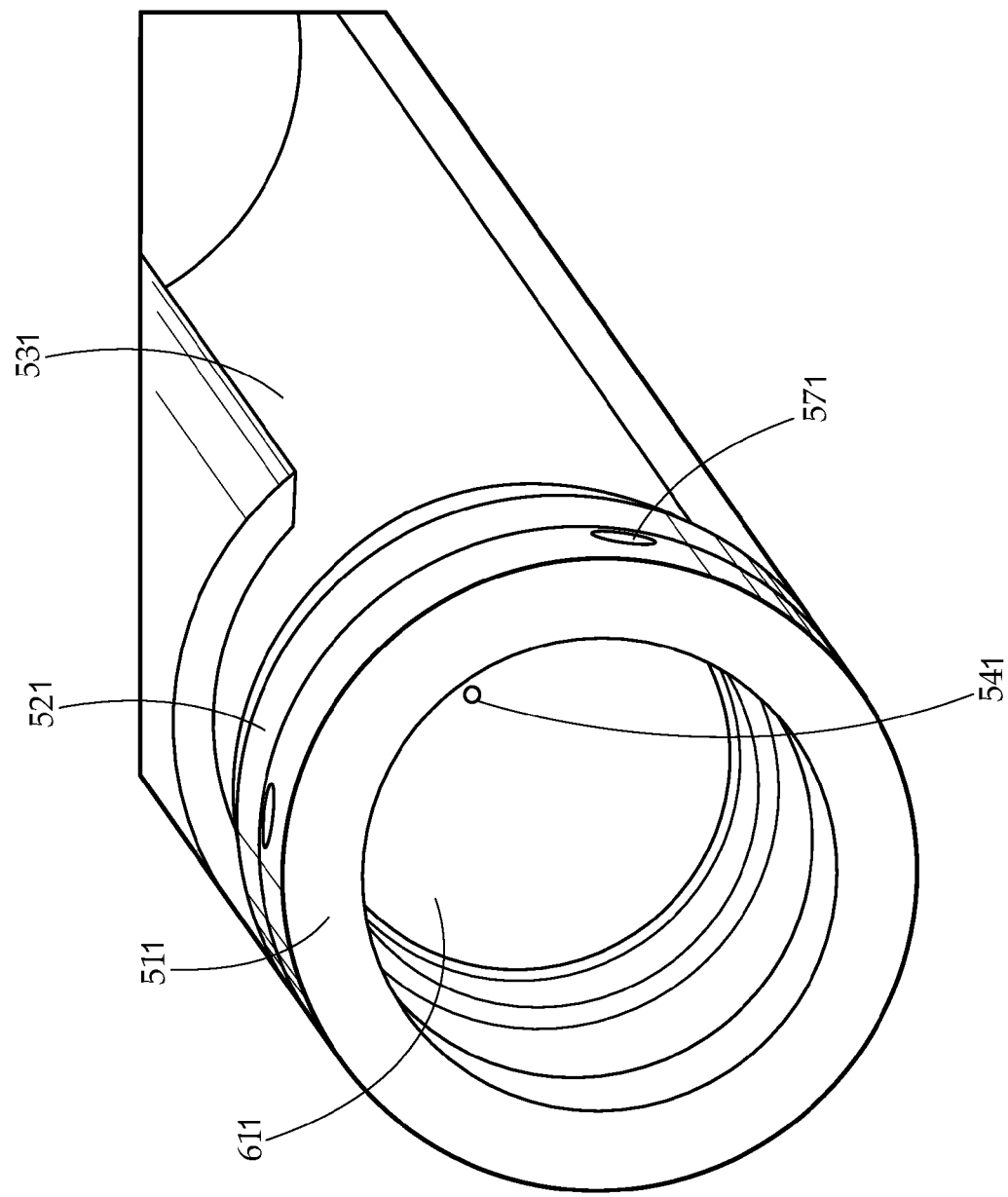
FIG. 6: A rear perspective cutaway view of an embodiment of the sizing tank is provided.

FIG. 6 provides a rear view of an embodiment of the present invention. The adapter 511 having inlet ports 571 is attached to the base 521 and forms a ring with a central aperture. An inner surface 611 of the flow controller can be seen. The inner surface 611 is also conically shaped. The base 521 is in turn attached to the tank 531 shown in a cutaway view.

Figure 7:
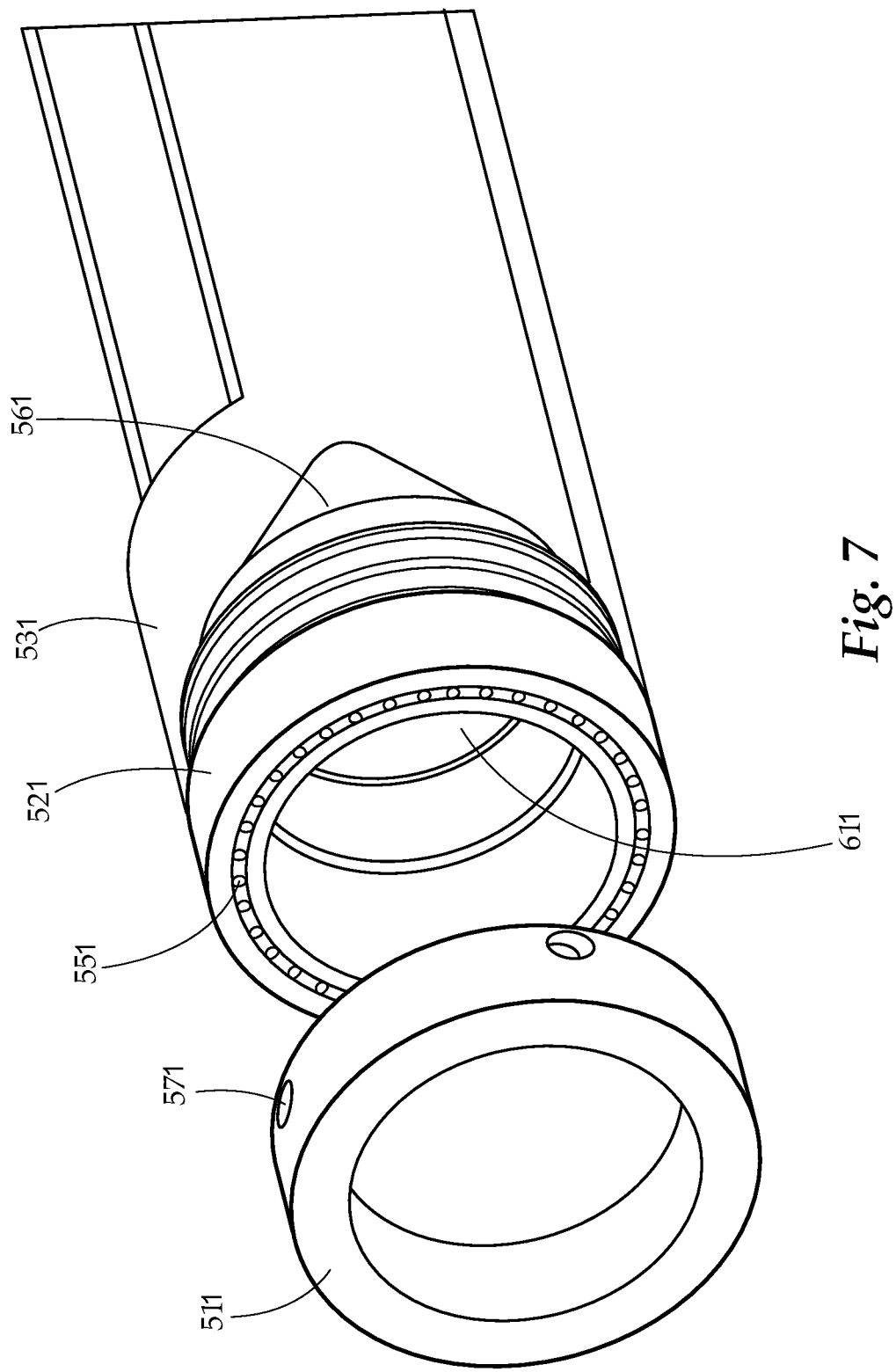
FIG. 7: A partially exploded rear perspective cutaway view of an embodiment of the sizing tank is provided.

FIG. 7 provides a partially exploded view of an embodiment of the present invention. The flow controller 561 is attached to the base 521, which in turn is attached to the tank 531. The adapter 511 is shown removed from the base 521 showing an interior of the inlet ports 551. An interior 611 of the flow controller 561 is shown. In operation, the adapter 511 forms a reservoir into which the fluid flows through the inlet port 571. Fluid in the reservoir flows through the inlet ports 551 and into the tank 531. Through precise control of the inlet fluid flow through the inlet ports 551 a fluid flow may be controlled to provide uniform, smooth flow with minimal eddying.

Figure 8:
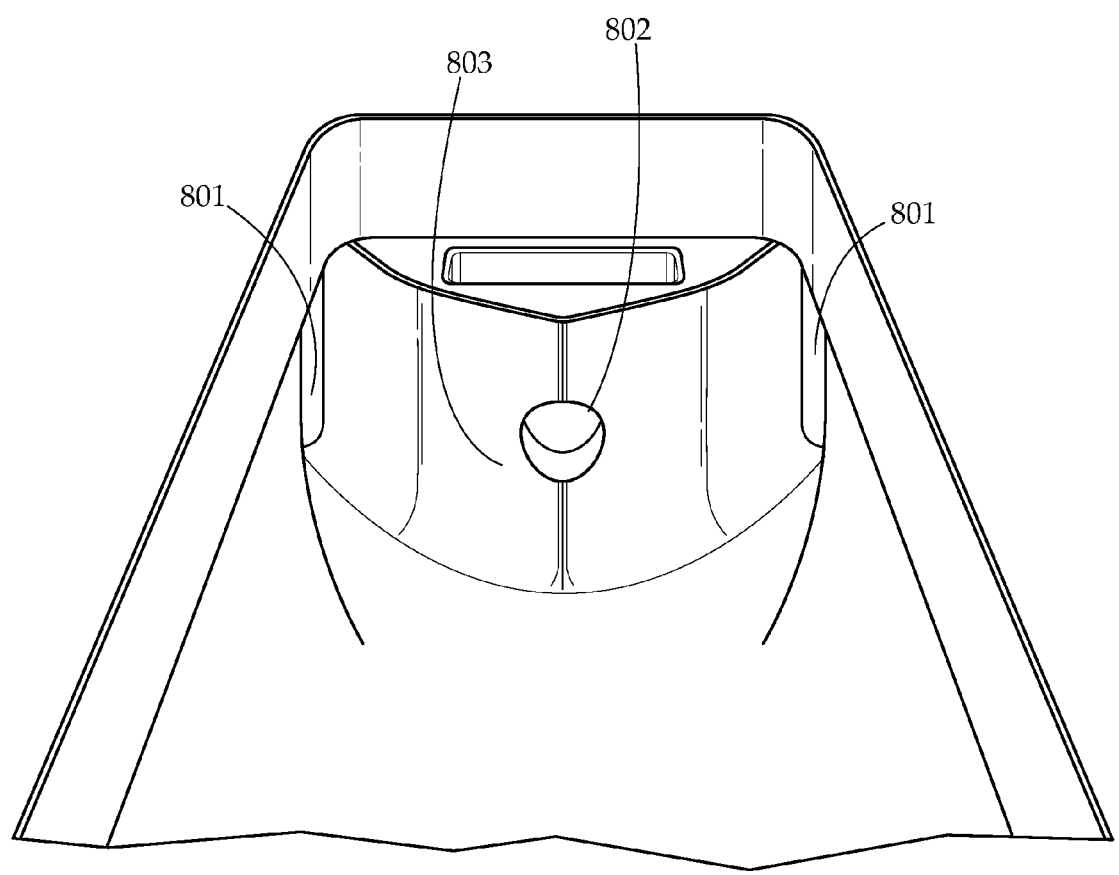
FIG. 8: A detail view of one embodiment of the trough of the sizing tank is provided.

FIG. 8 provides a detail view of one embodiment of the trough of the present invention. A splitter 803 is positioned at an outlet end of the trough. The splitter is constructed to divert fluid flow away from the center of the trough and towards a slit-shaped outlet 801 on each outer edge of the trough. An aperture 802 is sized and positioned to receive an extrudate exiting the trough.

Figure 9:
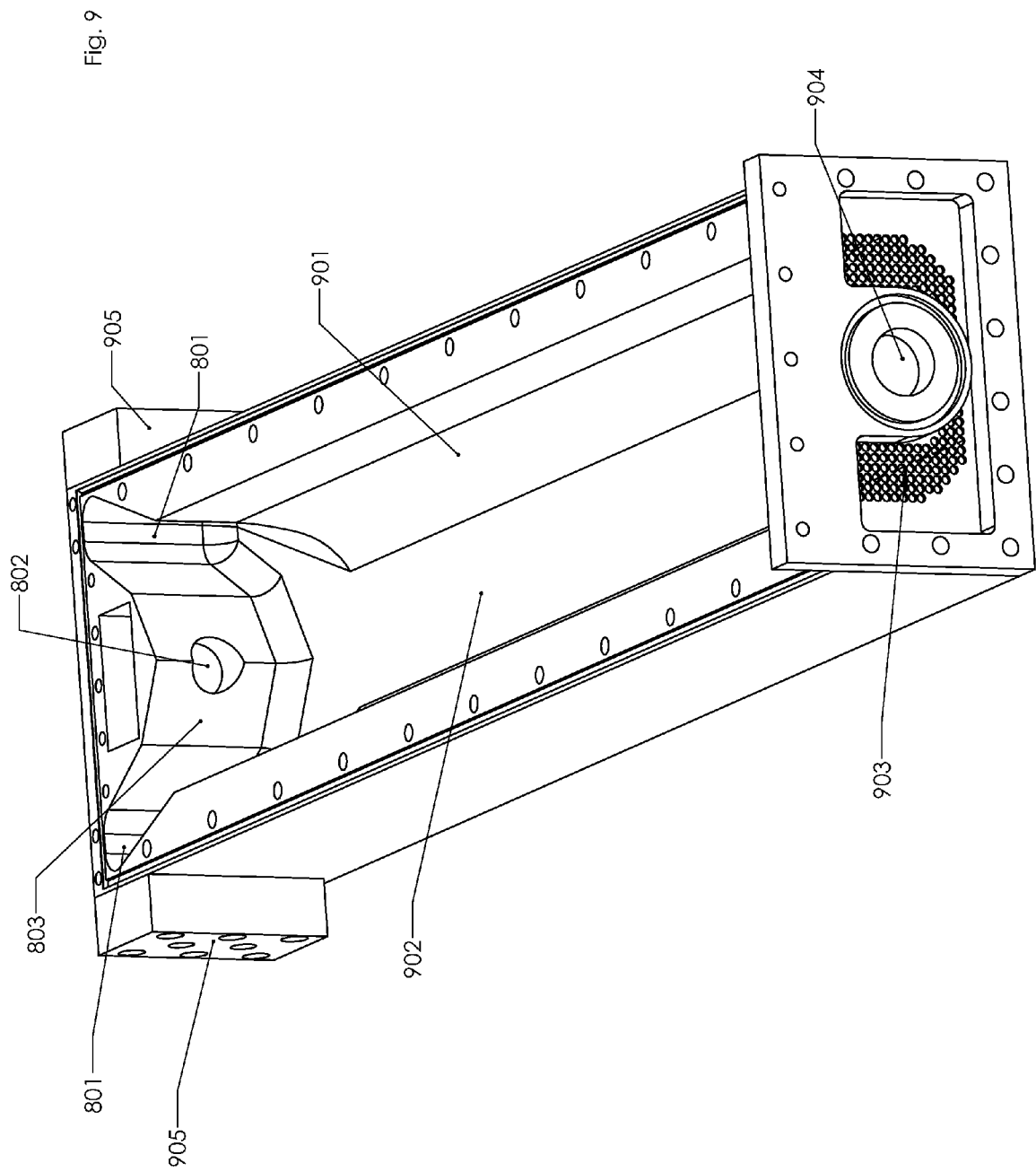
FIG. 9: A perspective view of one embodiment of the trough of the sizing tank is provided.

FIG. 9 provides a perspective view of an embodiment of the trough. A splitter 803 is positioned at an outlet end of the trough. The splitter is constructed to divert fluid flow away from the center of the trough and towards slit shaped outlets 801 on each outer edge of the trough. An aperture 802 is sized and positioned to receive an extrudate exiting the trough. Outlet tooling 905 is attached in fluid communication with the outlets 801. The outlet tooling 905 is configured with a plurality of apertures to optimize outlet flow. In one embodiment, the outlet tooling 905 may be configured to nearly eliminate eddies and dead spots near the outlets 801 within the tank. The tank trough has a curved portion 901 along its length. A bottom of the trough 902 is flat to slightly curved. Inlet flow tooling 903 is formed, in this embodiment, as a plurality of small apertures arranged in a shape substantially matching a cross section of the trough. The tooling 903 further forms a central aperture 904 through which fluid and/or extrudate may enter the trough. The central aperture 904 may be sized and configured to allow attachment of additional tooling to accommodate extrudate, additional fluid inlet, and the like.

As is noted previously, the embodiment shown in these figures could similarly be configured as an insert for an existing rectangular vacuum sizing tank, allowing retrofitting of existing tanks.

While several embodiments of the present invention have been described and illustrated herein, those of ordinary skill in the art will readily envision a variety of other means and/or structures for performing the functions and/or obtaining one or more of the advantages described herein, and each of such variations and/or modifications is deemed to be within the scope of the present invention. More generally, those skilled in the art will readily appreciate that all parameters, dimensions, materials, and configurations will depend upon the specific application or applications for which the teachings of the present invention is/are used. Those skilled in the art will recognize, or be able to ascertain using no more than routine experimentation, many equivalents to the specific embodiments of the invention described herein. It is therefore, to be understood that the foregoing embodiments are presented by way of example only and that, within the scope of the appended claims and equivalents thereto; the invention may be practiced otherwise than as specifically described and claimed. The present invention is directed to each individual feature, system, article, material, kit and/or method described herein. In addition, any combination of two or more such features, systems, articles, materials, kits, and/or methods are not mutually inconsistent, are included within the scope of the present invention.

What is claimed is:

1. A sizing tank comprising:
   a trough capable of holding a liquid, the trough having a first opening for an ingress of a plastic extrudate and a second opening for egress of the plastic extrudate;
   a pump system comprising a pump, the pump system constructed and arranged to provide a fluid flow within the trough and control fluid flow within the trough, a plurality of fluid inlets connected to the pump allowing fluid to enter the trough in a plurality of different positions;
   a plurality of fluid outlets allowing fluid to exit from the trough in a plurality of different positions; and
   wherein the plurality of fluid inlets and plurality of fluid outlets are constructed and arranged to provide a fluid flow within the trough, and configured to form a flow zone within the trough, the flow zone having a controlled and uniform flow profile.

2. The sizing tank of claim 1 wherein the pump, the plurality of fluid inlets and plurality of fluid outlets are capable of controlling a fluid flow within the trough by forming a plurality of flow zones, the plurality of flow zones having a substantially controlled and substantially uniform flow profile throughout each zone.

3. The sizing tank of claim 1 wherein the flow profile of the flow zone is substantially laminar.

4. The sizing tank of claim 1 wherein the flow profile of the flow zone is controlled to prevent formation of an eddy at or near a surface of the plastic extrudate.

5. The sizing tank of claim 1 wherein the trough further comprises a plurality of flow channels, the plurality of flow channels being formed by the tank, a first of the plurality of fluid inlets being positioned at one end of a first of the plurality of flow channels, an opposite end of the flow channel opening into the trough and directing at least a portion of the fluid flow from the first of the plurality of fluid inlets.

6. The sizing tank of claim 1 wherein one of the plurality of fluid inlets having a corresponding one of the plurality of fluid outlets, such that substantially all fluid entering the trough from the one of the plurality of fluid inlets exits the trough from the corresponding one of the plurality of fluid outlets.

7. The sizing tank of claim 2 wherein the plurality of flow zones are defined along a width of the tank, with flow of each of the plurality of flow zones being substantially parallel to a direction of the plastic extrudate, an interface of adjacent flow zones causing an interaction of characteristics between the adjacent flow zones.

8. The sizing tank of claim 7 further comprising a first of the plurality of zones adjacent to a second of the plurality of zones, a fluid of the first of the plurality of zones having a first temperature at inlet to the tank, a fluid of the second of the plurality of zones having a second temperature different from the first temperature at inlet to the tank;
   wherein an interaction of characteristics between the adjacent flow zones causes the fluid of the first of the plurality of zones to reach a third temperature at outlet from the tank, and causes the fluid of the second of the plurality of zones to reach a fourth temperature at outlet from the tank.

9. The sizing tank of claim 1 further comprising a flow splitter positioned on an outlet end of the trough, the flow splitter having a substantially 'v' shape, a pointed end of the flow splitter being positioned at a center of a width of the trough, facing a fluid flow in the trough, the flow splitter constructed and arranged to direct fluid flow towards an outer edge of the trough, one of the plurality of fluid outlets being positioned at a corner formed by a broad end of the flow splitter.

10. The sizing tank of claim 1 further comprising a second pump, the pump being attached to at least one of the plurality of fluid inlets, the second pump being attached to at least one of the plurality of fluid outlets.

11. The sizing tank of claim 1 further comprising a fluid control system, the fluid control system comprising:
    a flow sensor disposed within the trough, configured to monitor the fluid flow within the tank; and
    a fluid controller in communication with the flow sensor, the controller configured to adjust the pump to increase the fluid flow when the flow sensor senses a decrease in flow, and configured to adjust the pump to decrease the fluid flow when the flow sensor senses an increase in flow, the fluid controller being in communication with the pump.

12. The sizing tank of claim 11 further comprising a programmable interface allowing programming of a plurality of different fluid flow controls into the fluid controller.

13. The sizing tank of claim 1 further comprising:
    a pressure gauge disposed on an exterior of the tank providing a display of a pressure within the trough;
    a temperature gauge disposed on an exterior of the tank providing a display of a fluid temperature at a position within the trough;
    a flow gauge disposed on an exterior of the tank providing a display of a fluid flow rate at a position within the trough.

14. A sizing tank comprising:
    a cylindrical trough formed by the tank capable of holding a liquid, the tank having a first end for ingress of a plastic extrudate and a second end for egress of the plastic extrudate, the extrudate being cylindrically shaped at ingress;
    a pump constructed and arranged to provide a fluid flow to the tank;
    a conically shaped flow controller positioned at the first end, the flow controller forming an opening at a tip end for the ingress of the plastic extrudate;
    a plurality of fluid inlet ports formed about a circumference of a base of the conically shaped flow controller, the plurality of fluid inlet ports being connected to the pump and constructed and arranged to direct a fluid flow into the tank;
    a plurality of fluid outlet ports allowing fluid to exit from the tank; and
    wherein the conically shaped flow controller, the plurality of fluid inlet ports, and the plurality of fluid outlet ports are formed to direct a fluid flow in a uniform and controlled flow profile throughout the cylindrical tank and about the cylindrically shaped extrudate.

15. The sizing tank of claim 14 further comprising a control system, the control system comprising:
a sensor configured to sense an operating parameter within the tank;
a computerized controller in communication with the sensor and configured to control the operating parameter sensed, the controller configured to control the operating parameter sensed when the sensor senses that the operating parameter is outside of a specified tolerance.

16. A system for retrofitting a rectangular sizing tank comprising:
an insert having an exterior sized to fit within the rectangular sizing tank, and an interior defining a trough capable of holding a liquid, the trough having a first opening for an ingress of a plastic extrudate and a second opening for egress of the plastic extrudate aligning with openings of the rectangular sizing tank;
a pump system comprising a pump, the pump system constructed and arranged to provide a fluid flow within the trough and control fluid flow within the trough, a plurality of fluid inlets defined by the insert connected to the pump and allowing fluid to enter the trough in a plurality of different positions;
a plurality of fluid outlets defined by the insert allowing fluid to exit from the trough in a plurality of different positions; and
wherein the plurality of fluid inlets and plurality of fluid outlets are constructed and arranged to provide a fluid flow within the trough, and configured to form a flow zone within the trough, the flow zone having a controlled and uniform flow profile.

17. The system of claim 16 wherein the flow profile of the flow zone is substantially laminar.

18. The system of claim 16 wherein the pump, the plurality of fluid inlets and plurality of fluid outlets are capable of controlling a fluid flow within the trough by forming a plurality of flow zones, the plurality of flow zones having a substantially controlled and substantially uniform flow profile throughout each zone.

19. The system of claim 16 further comprising:
a pressure gauge disposed on an exterior of the tank providing a display of a pressure within the trough;
a temperature gauge disposed on an exterior of the tank providing a display of a fluid temperature at a position within the trough;
a flow gauge disposed on an exterior of the tank providing a display of a fluid flow rate at a position within the trough.

20. The system of claim 19 wherein the trough further comprises a plurality of flow channels, the plurality of flow channels being formed by the tank, a first of the plurality of fluid inlets being positioned at one end of a first of the plurality of flow channels, an opposite end of the flow channel opening into the trough and directing at least a portion of the fluid flow from the first of the plurality of fluid inlets.

* * * * *